United States Patent
Sinyagin et al.

(10) Patent No.: US 9,177,333 B2
(45) Date of Patent: Nov. 3, 2015

(54) AD COPY QUALITY DETECTION AND SCORING

(75) Inventors: Aleksey Y. Sinyagin, Bothell, WA (US); Yang Ye, Kirkland, WA (US); Yi-Min Wang, Bellevue, WA (US); Kuansan Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 500 days.

(21) Appl. No.: 12/817,928

(22) Filed: Jun. 17, 2010

(65) Prior Publication Data

US 2011/0313865 A1 Dec. 22, 2011

(51) Int. Cl.
*G06Q 30/02* (2012.01)
*G06F 17/27* (2006.01)

(52) U.S. Cl.
CPC .......... *G06Q 30/0273* (2013.01); *G06F 17/274* (2013.01); *G06Q 30/0241* (2013.01); *G06Q 30/0277* (2013.01)

(58) Field of Classification Search
CPC ...................................................... G06Q 30/00
USPC ............................................ 705/14; 707/754
See application file for complete search history.

(56) References Cited

U.S. PATENT DOCUMENTS

| | | | |
|---|---|---|---|
| 7,295,996 B2 | 11/2007 | Skinner | |
| 7,792,846 B1 * | 9/2010 | Raffill et al. | 707/754 |
| 2004/0019523 A1 | 1/2004 | Barry et al. | |
| 2005/0021397 A1 | 1/2005 | Cui | |
| 2005/0154578 A1 | 7/2005 | Tong et al. | |
| 2005/0165642 A1 * | 7/2005 | Brouze et al. | 705/14 |
| 2005/0222902 A1 * | 10/2005 | Coit et al. | 705/14 |
| 2006/0069613 A1 * | 3/2006 | Marquardt | 705/14 |
| 2007/0156621 A1 | 7/2007 | Wright | |
| 2007/0156887 A1 | 7/2007 | Wright | |
| 2007/0255690 A1 | 11/2007 | Chang | |
| 2008/0103893 A1 | 5/2008 | Nagarajan | |
| 2008/0147380 A1 | 6/2008 | Barliga et al. | |
| 2008/0255915 A1 * | 10/2008 | Collins et al. | 705/8 |
| 2009/0063278 A1 | 3/2009 | Song et al. | |
| 2009/0254414 A1 * | 10/2009 | Schwarz et al. | 705/10 |
| 2009/0276381 A1 * | 11/2009 | Boies et al. | 706/12 |
| 2009/0327032 A1 | 12/2009 | Gunawardana | |

OTHER PUBLICATIONS

Esearchvision; Effectively Managing Quality Score [White Paper]; Retrieval Date: Apr. 17, 2010; 6 pages, http://esearchvision.com/media/106659/effectively%20managing%20qs.pdf.

(Continued)

*Primary Examiner* — Eric Netzloff
(74) *Attorney, Agent, or Firm* — Joann Dewey; Jim Ross; Micky Minhas

(57) ABSTRACT

Methods, systems, and computer-readable media for evaluating the quality of text within online advertisements using output from a language model are provided. The output from the language model may be used by a machine-learning algorithm to generate a quality score for an individual advertisement. The quality score may be used to filter out advertisements with poor text quality or to tax or penalize an advertisement within an online auction. The ad quality scores may also be used to rank or score advertisers that submit the ads. In one embodiment, the advertiser's quality score is combined with an individual ad's quality score to create a final score, which is used to evaluate the advertisement. The advertiser rank/score and ad quality score may be communicated to an advertiser as advertiser feedback.

20 Claims, 7 Drawing Sheets

(56) References Cited

OTHER PUBLICATIONS

PCT Notification of Transmittal of the International Search Report and the Written Opinion of the International Searching Authority, or the Declaration, Mailing Date: Feb. 9, 2012, International Filing Date: Jun. 1, 2011, International Application No. PCT/US2011/038737.

\* cited by examiner

AD COPY QUALITY DETECTION AND SCORING

BACKGROUND

Online advertising exchanges let advertisers purchase online advertising space from publishers. Publishers (content and property owners) may auction the advertising space off on a cost-per-click or other basis where the price the publishers get for displaying the advertisement is dependent on a viewer's positive response to the advertisement. Some advertisements may contain grammatically incorrect text or other text errors that discourage viewers from clicking the advertisement.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention evaluate the quality of text within online advertisements using output from a language model. The output from the language model may be used by a machine-learning algorithm to generate a quality score for an individual advertisement. Ads with poor quality text may be filtered or taxed within an online auction. The ad quality scores may also be used to rank or score advertisers that submit the ads. In one embodiment, the advertiser's quality score is combined with an individual ad's quality score to create a final score which is used to evaluate the advertisement. The advertiser rank/score and ad quality score may be communicated to an advertiser as advertiser feedback.

BRIEF DESCRIPTION OF THE DRAWINGS

Embodiments of the invention are described in detail below with reference to the attached drawing figures, wherein.

DETAILED DESCRIPTION

Figure 1:
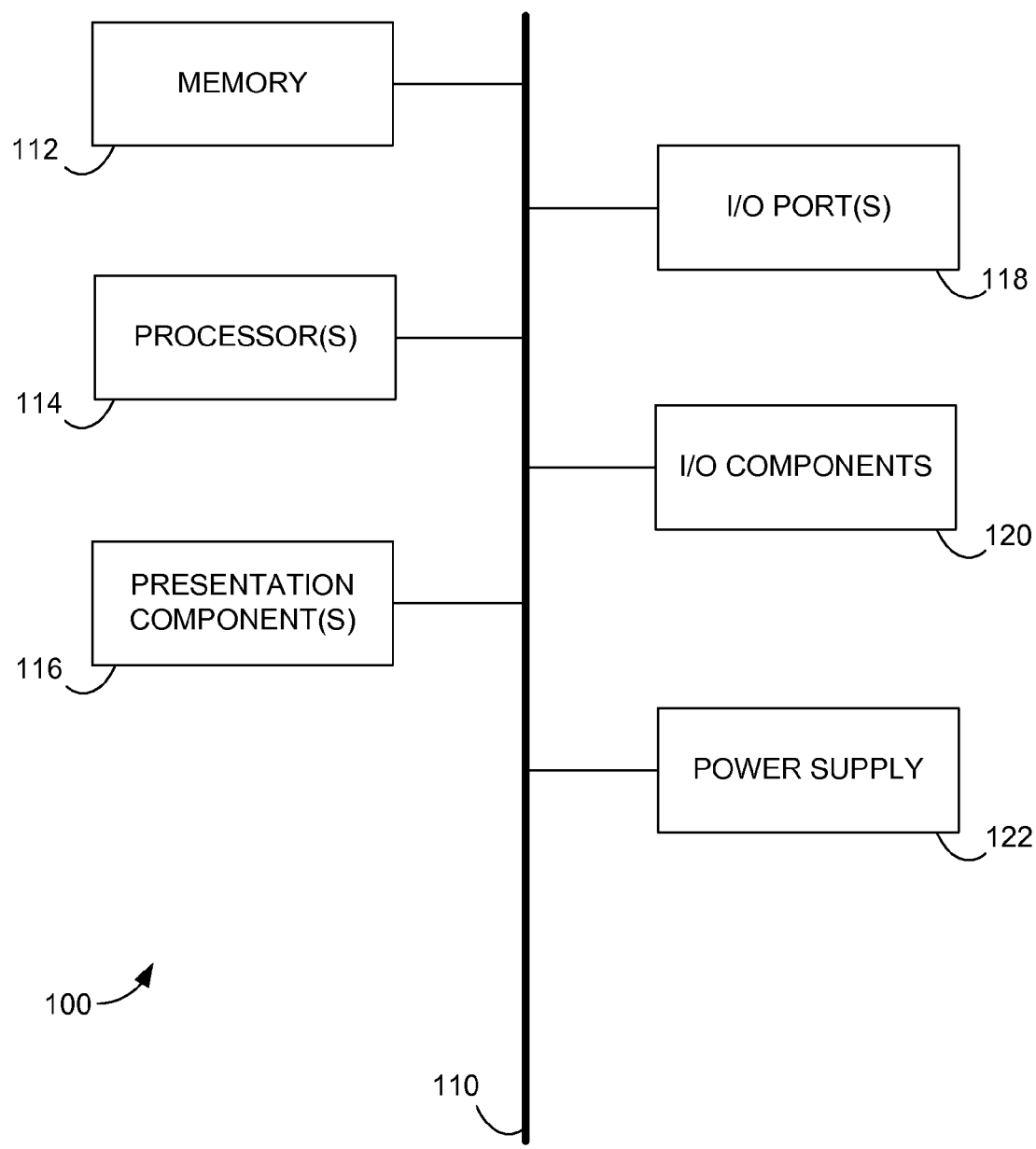
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention evaluate the intrinsic quality of textual content within online advertisements that is independent of the search query. Output from a language model is used to determine the text quality within an advertisement. The output from the language model may be used by a machine-learning algorithm to generate a quality score for an individual advertisement. The machine-learning algorithm may be trained using a combination of the output from the language model, human training data, and one or more heuristics.

The quality score may be used to filter out advertisements with poor text quality. The quality score may also be used to tax or penalize an advertisement within an online auction. A tax in an online auction may cause an advertiser to pay more, relative to an advertisement that is not taxed, to show the advertisement or win the auction. In a non-auction advertising context, the ad with a poor text quality may be ranked lower than other ads with good text quality and, therefore, be less likely to be displayed. In another embodiment, advertisements with a quality score within a range may be designated for editorial review prior to display through an advertising exchange.

The ad quality scores may also be used to rank or score advertisers that submit the ads. In one embodiment, the advertiser's quality score is combined with an individual ad's quality score to create a final score which is used to evaluate the advertisement. The advertiser rank/score and ad quality score may be communicated to an advertiser as advertiser feedback.

Accordingly, in one embodiment, one or more computer-readable media having computer-executable instructions embodied for one or more computer-readable media having computer-executable instructions embodied thereon that when executed by a computing device perform a method of determining an online advertisement's quality based on the online advertisement's text. The method includes receiving an advertisement that contains text, parsing the text into one or more n-grams, and generating a quality score for the advertisement based, at least in part, on a frequency with which the one or more n-grams occur within a language model.

In another embodiment, a method of determining an online advertisement's quality based on the online advertisement's text. The method includes receiving a human input describing a quality of each of a plurality of online advertisements. The method also includes generating a language model using text from a plurality of advertisements, wherein the language model allows an n-gram's frequency of occurrence within the plurality of advertisements to be determined. The method includes generating a final model based on a combination of the language model and the human input. The method also includes calculating a quality score for an online advertisement using the final model. The method also includes storing the quality score with an indication that identifies the online advertisement to which the quality score is assigned.

In one embodiment, one or more computer-readable media having computer-executable instructions embodied that when executed by a computing device perform a method of determining an online advertisement's quality based on the online advertisement's text. The method includes receiving an online advertisement having a textual title and a textual description. The method also includes assigning a quality score to the online advertisement using a machine-learning algorithm that is trained using an output from a language model and human annotation as ground truth data. The method further includes storing the quality score with an indication that identifies the online advertisement to which the quality score is assigned.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120t. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. By way of example, and not limitation, computer-storage media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary System Architecture

Figure 2:
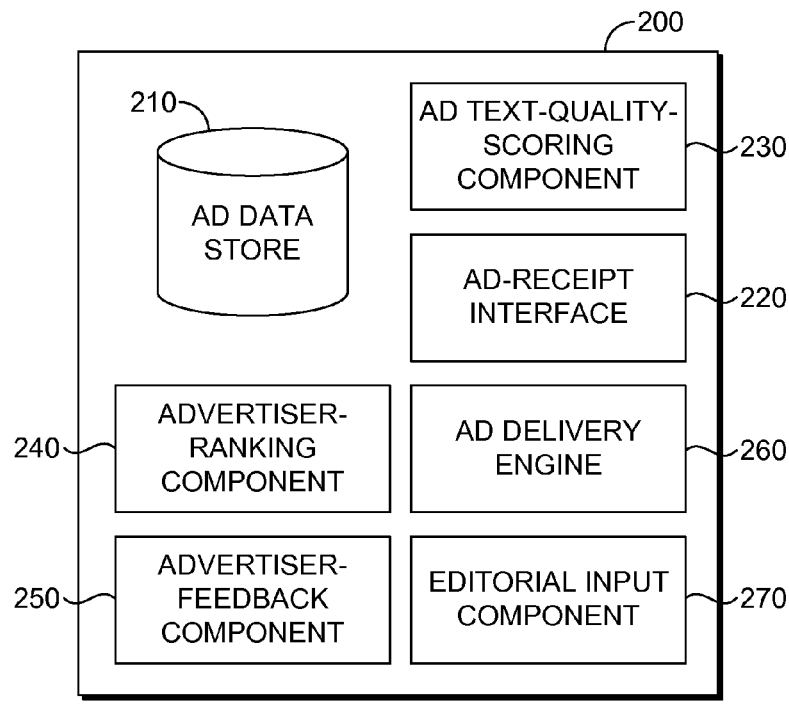
FIG. 2 is a diagram of an computing system architecture suitable for detecting text quality within an advertisement, in accordance with an embodiment of the present invention.

Turning now to FIG. 2, an exemplary computing system architecture 200 suitable for evaluating text within an advertisement is shown, in accordance with an embodiment of the present invention. The computing system architecture 200 shown in FIG. 2 is an example of one suitable computing system architecture 200. The computing system architecture 200 runs on one or more computing devices similar to the computing device 100 described with reference to FIG. 1. The computing system architecture 200 should not be interpreted as having any dependency or requirement related to any single module/component or combination of modules/components illustrated therein. The computing system architecture 200 includes an ad data store 210, an ad-receipt interface 220, an ad text-quality-scoring component 230, advertiser-ranking component 240, advertiser-feedback component 250, ad delivery engine 260, and editorial input component 270. The computing system architecture 200 may be part of, or used with, an online advertising exchange. The online advertising exchange helps publishers sell ad space to advertisers.

The ad data store 210 stores a plurality of online advertisements. An online advertisement may be displayed on a webpage or through another electronic media. A search results webpage is one example of a webpage on which online advertisements may be displayed. Online advertisements may be matched to a suitable webpage through keywords associated with the advertisement and keywords associated with the webpage or document. Keywords on a search results webpage may be drawn from words within or related to words in a search query. The online advertisement may be a paid search result. The online advertisements may include graphic elements as well as text.

The ad-receipt interface 220 receives advertisements from advertisers. The ad-receipt interface 220 may provide a graphical user interface through which advertisements are uploaded to an advertising exchange. The ad-receipt interface 220 may communicate ads to the ad data store 210. The ad-receipt interface 220 may allow a user to associate keywords with an advertisement, submit bids for advertising space, and specify other criteria for displaying an ad.

The ad text-quality-scoring component 230 assigns a quality score to an advertisement based on text within the advertisement. The quality score may be associated with the advertisement and stored for later consumption within the ad data store 210 or a separate data store (not shown). The operation of the ad text-quality-scoring component 230 will be explained in more detail subsequently. In brief, it evaluates the text within an advertisement using a machine-learning algorithm and produces a quality score. The machine-learning algorithm uses output from a language model built using a corpus of text taken from a random sample of advertisements. In general, the machine-learning algorithm may produce a lower score for advertisements that contain words or a series of words that occur infrequently within the corpus of training ads. The output from the language model allows the machine-learning algorithm to determine the frequency with which words, phrases, and characters occur within advertisements.

The advertiser-ranking component 240 assigns a quality score or quality rank to advertisers that have submitted one or more ads to an advertising exchange. The advertiser's rank is related to the quality score assigned to ads submitted by the advertiser. In one embodiment, the advertiser quality score is the average quality score assigned to advertisements submitted by the advertiser.

The advertiser-feedback component 250 communicates advertiser feedback to an advertiser. The advertiser feedback may be an advertiser's score or quality scores assigned to individual ads submitted by the advertiser. The advertiser feedback component may share a penalty, tax, or other information related to actions taken in response to a quality score assigned to an advertiser's ad. The advertiser-feedback component 250 may inform an advertiser when an ad has been filtered due to a low quality score. A filtered ad is prohibited from being displayed through the advertising exchange.

The ad delivery engine 260 delivers advertisements to publishing space available through an advertising exchange. The ad delivery engine 260 may use a variety of methods to determine which advertisement to deliver to a particular advertising space in a particular situation. For example, the relevance of the advertisement to the webpage as measured, in part by keywords associated with an advertisement in a webpage, may determine which ad is delivered. A bid price submitted by an advertiser to display their ad in a space is another factor. The performance, or expected performance, of the advertisement in the space may also be considered. In one embodiment, the quality score is used to estimate the expected performance of an advertisement. In some advertising exchanges, an advertiser pays on a cost-per-click (CPC) basis for displaying an advertisement. In other words, the advertiser only pays when a viewer clicks their ad. In this situation, the expected percentage of viewers that will click the advertisement is factored into a winning bid. In other words, an advertiser willing to pay seven dollars per click with a 20% click rate will be favored over a bidder willing to pay five dollars per click with the same 20% expected click rate. In general, an advertisement with a lower text quality may be expected to receive a fewer percentage of clicks from viewers. In this case, the quality score can be another factor used to estimate the expected performance of a particular ad.

The ad delivery engine 260 may pull the quality score from the ad data store 210, or other data store, when evaluating which ad to show. In one embodiment, ads with a quality score below a threshold are excluded from delivery by the ad delivery engine 260. Effectively, ads with below a threshold quality score are filtered. In one embodiment, the quality score may be used to determine where an advertisement is shown on a page to which multiple ads are delivered. In other words, an advertisement with a high quality score may be given a spot at the top of the page while an advertisement with a low quality score is given a less desirable spot at the bottom of the page.

The editorial input component 270 facilitates receipt of human input describing the quality of an advertisement. The human input may be used as training data within the machine-learning algorithm used by the ad text-quality-scoring component 230. The input may also be used to adjust the quality rank of an advertisement that was designated for editorial review because a quality rank assigned to the ad fell into a designated range.

In one embodiment, the editorial input component 270 generates an interface that displays an advertisement to a user. The interface allows the user to provide an overall quality score for the advertisement. In one embodiment, the quality score is a rank of either 1, 2, 3, 4, or 5. The interface also allows the user to select portions of text and associate that portion of text with a particular defect. Examples of defects include misspellings, grammar errors, excessive capitalization, gibberish, sentence fragments, text cutoff, semantic errors, and other defects. The editorial input component 270 collects the user data and submits the data as training data to the machine-learning algorithm.

Figure 3:
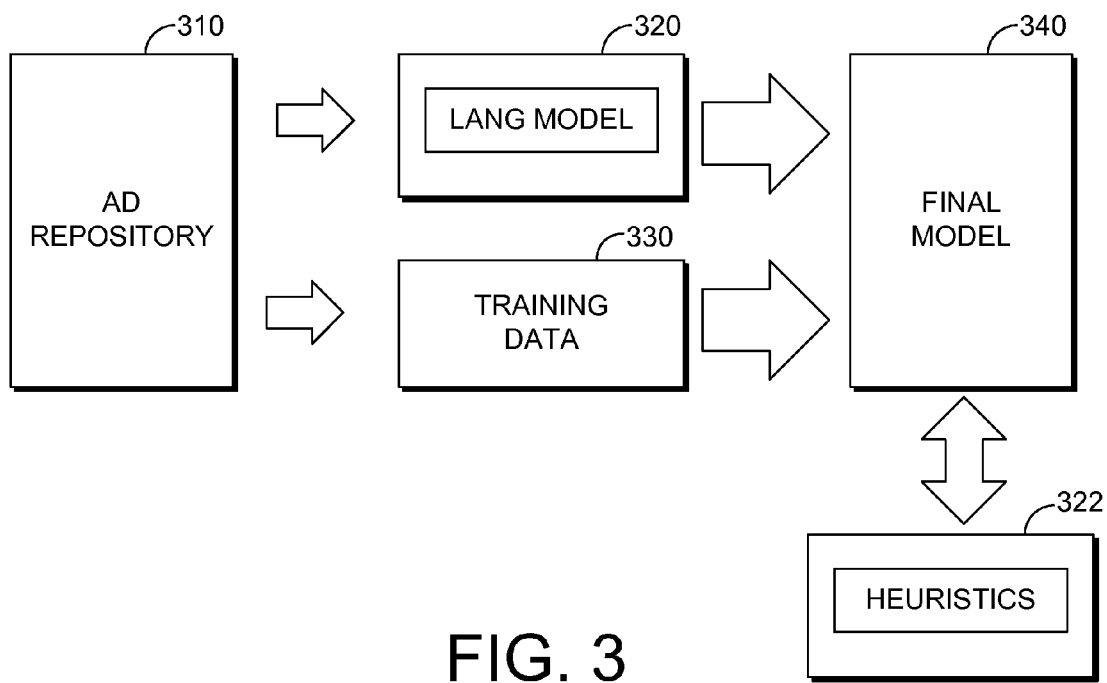
FIG. 3 is a diagram illustrating components used to generate a final model that generates the quality score for an advertisement, in accordance with an embodiment of the present invention.

Turning now to FIG. 3, a diagram illustrating the generation of a final model that scores text in an advertisement is shown, according to an embodiment of the present invention. The final model 340 may be based on a machine-learning algorithm. In general, a machine-learning algorithm automatically learns to recognize complex patterns based on data provided to the algorithm. Once patterns are recognized in the training data, new input can be evaluated to determine whether the new input matches a known pattern. The final model is trained to recognize patterns in advertising text that correlate to the quality of the text. A quality score is generated based on patterns recognized in an advertisement's text. Examples of machine-learning algorithms that may be used in embodiments of the present invention include support vector machines, neural networks, and Bayesian networks.

The ad repository 310 stores a group of online advertisements that contain text. The ad repository 310 may be similar to the ad data store 210 described previously with reference to FIG. 2. The text from advertisements in the ad repository 310 form a text corpus that is used to build the language model 320 that provides output used in the final model 340. The language model 320 can be used to determine the frequency with which certain words, characters, or phrases within an advertisement's text occur within all ads within the ad repository 310. The language model is built of existing ad corpus and applying statistical thresholds to identify ads which fall into categories. A statistical n-gram language model assigns a probability to a sequence of m words from ad corpus by means of a probability distribution.

In an n-gram model, the probability $P(w_1, \ldots, w_m)$ of observing the sentence $w_1, \ldots, w_m$ is approximated as $$P(w_1, \ldots, w_m) = \prod_{i=1}^{m} P(w_i | w_1, \ldots, w_{i-1}) \approx \prod_{i=1}^{m} P(w_i | w_{i-(n-1)}, \ldots, w_{i-1})$$

Here, it is assumed that the probability of observing the ith word $w_1$ in the context history of the preceding i−1 words can be approximated by the probability of observing it in the shortened context history of the preceding n−1 words. The words bigram and trigram denote n-gram language models with n=2 and n=3, respectively. The conditional probability can be calculated from n-gram frequency counts:

$$P(w_i | w_{i-(n-1)}, \ldots, w_{i-1}) = \frac{\text{count}(w_{i-(n-1)}, \ldots, w_{i-1}, w_i)}{\text{count}(w_{i-(n-1)}, \ldots, w_{i-1})}$$

Phrases that occur frequently may represent good advertising text. Infrequent terms, or terms that don't appear at all within the corpus, may indicate a misspelling or other problem. Smoothing methods may be used to handle terms that do not appear at all in the corpus of advertising text. In one embodiment, a Laplace addictive smoothing is used to handle n-grams that do not appear in the corpus. In one embodiment, unknown n-grams are stored in a dictionary for later evaluation. N-grams that are placed in the dictionary multiple times may automatically be added to the corpus.

A random selection of ads within ad repository 310 are used to generate training data 330. Collecting training data 330 involves receiving editorial comments from human viewers of the advertisements. Two types of feedback form the training data 330. The training data 330 may include an overall quality score provided by the human viewers for the advertisement as well as individual errors found within the text. The training data 330 may be combined with output from the language model 320 to build a final model 340. Heuristic rules 322 may also be incorporated into the final model 340 as a post-processing step or as part of the machine-learning algorithm. One example of a heuristic rule is tagging an ad copy with two consecutive prepositions as bad quality, which is a common error found in ad copies. For example, "Buy books on at Bookstore" is predicted to be bad quality because it contains two prepositions "on" and "at" right next to each other.

The training data 330 when combined with the output from the language model 320 allows the machine-learning algorithm to weigh the predictive variable including a frequency score from the language model based on terms and phrases within ad text differently. For example, if a term occurs frequently but is often associated with advertisements that receive a poor overall score then inclusion of the term in an ad will contribute to a lower quality score. Once the final model 340 is built, a new advertisement or an existing advertisement within the ad repository 310, may receive a quality score using the final model.

Figure 4:
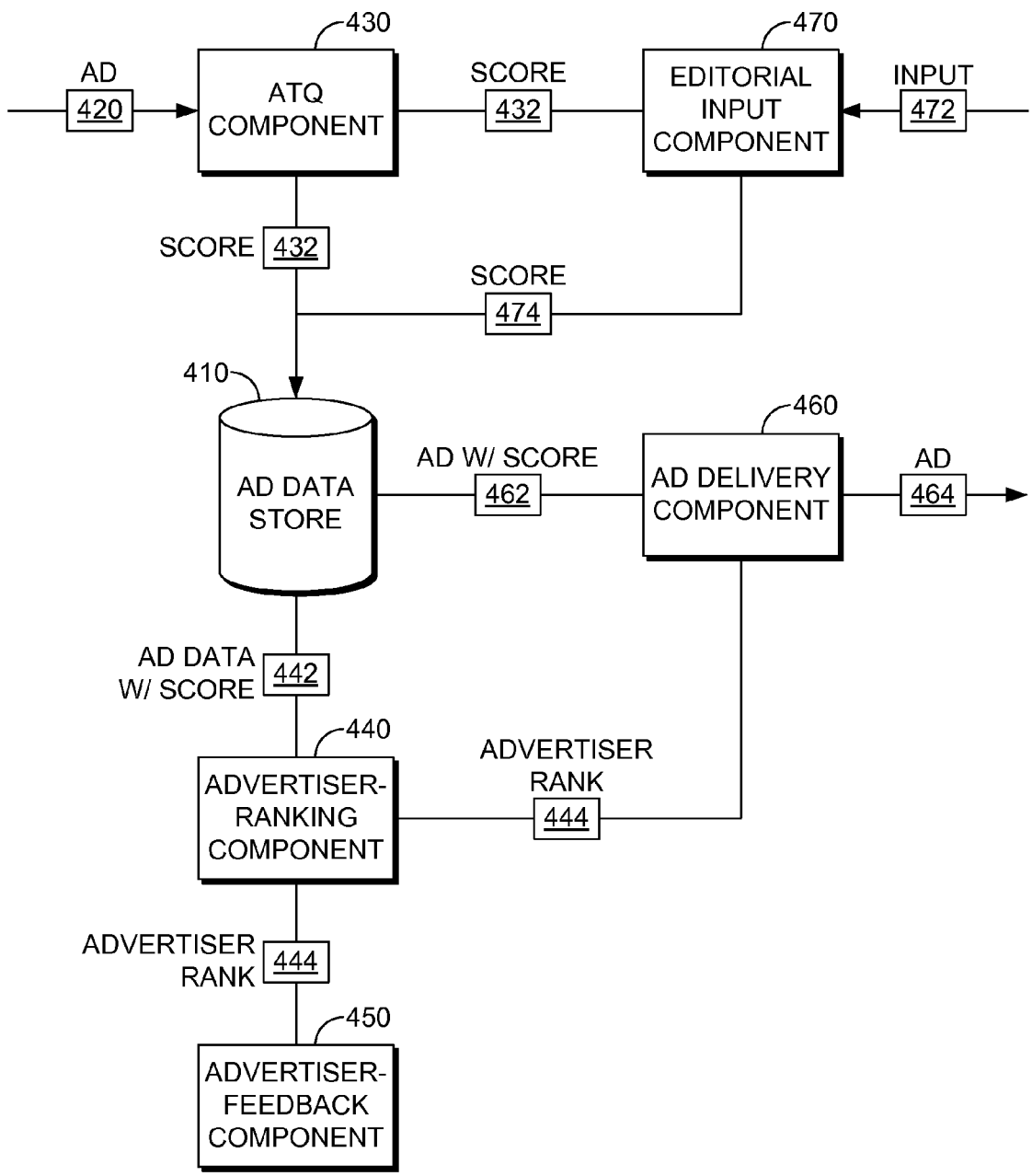
FIG. 4 is a diagram illustrating the generation of a quality score for an advertisement, in accordance with an embodiment of the present invention.

Turning now to FIG. 4, a diagram illustrating the generation of a quality score for an advertisement is shown, in accordance with an embodiment of the present invention. Initially, an advertisement 420 is received by ad-text-quality component 430. The ad-text-quality component 430 generates a quality score 432 for the ad text in ad 420. As described previously, the ad-text-quality-component 430 uses a machine-learning algorithm, such as final model 340 to generate the quality score 432. The ad-text-quality component 430 may communicate the quality score 432 to different components in different embodiments.

In one embodiment, the quality score 432 is sent to an ad data store 410 to be associated with the ad 420. Though not shown, the ad 420 may have been previously added to ad data store 410 or may be added at the same time the quality score 432 is sent to the ad data store. In an embodiment, when the ad quality score is ambiguous or is below a certain threshold representing presumptively poor text quality, the ad is designated to receive editorial comments. The ad is sent to an editorial input component 470. The editorial input component 470 receives human input 472 that ranks the specific advertisement. In one embodiment, the human input 472 may be fed into the machine-learning algorithm as additional training data. In another embodiment, the editorial input component 470 is used to generate a revised quality score 474. The revised quality score 474 may be sent to the ad data store 410.

Once the ad and the score 432 or the score 474 are in ad data store 410, they may be used by a number of other components. In one embodiment, the ad delivery component 460 receives the ad with the score 462 and delivers the ad 464 to a publisher. The ad delivery component 460 may be similar to the ad delivery engine 260 described previously with reference to FIG. 2. The ad delivery component 460 may use the quality score 432 to filter or prevent the display of ads that have a quality score that is below a threshold score. In another embodiment, the ad delivery component 460 penalizes an ad according to the score or otherwise uses the score to rank the suitability of an advertisement to be displayed in a particular space. In other words, the ad delivery component 460 may reduce the relevance or priority of an advertisement based on a low quality score and may increase the relevance or priority rank of an advertisement with a high quality score. In another embodiment, the ad delivery component 460 imposes a surcharge on the ad 464 to be shown. In other words, the advertiser will need to pay more to have the ad displayed than would other advertisers that submitted ads with a higher quality score. The amount of the surcharge may be based on the quality score.

The advertiser-ranking component 440 may also take advertising data with the score 442 from the ad data store 410. The advertising-ranking component 440 may not need the ad itself to rank the advertiser. The ad data may include a description of the advertisement, the advertiser that submitted the ad, and the score associated with the particular ad. The advertising-ranking component 440 generates an advertiser rank based on the score associated with the advertisements submitted by the advertiser. In one embodiment, the advertiser rank is based on the average quality score assigned to ads submitted by the advertiser. The advertiser rank 444 may be sent to an advertiser-feedback component 450. The advertiser-feedback component 450 may communicate the advertiser rank to the advertiser. Though not shown, the advertiser-feedback component 450 may also share individual ad scores assigned to particular advertisements so that the advertiser can improve their ad quality or at least understand why their advertisements are receiving a certain quality rank.

The advertiser rank 444 may also be communicated to the ad delivery component 460. The advertiser rank 444 may be used in conjunction with the ad's score to determine what actions should be taken with a particular advertisement. For example, if an ad has a low quality score and the advertiser rank is quite low, the ad delivery component 460 may choose to block the ad altogether. On the other hand, if an advertiser with a high rank submitted an ad with a low score, the ad delivery component may choose just to demote that particular ad's ranking score, but not filter the ad entirely. In addition, various formulas to calculate a tax, penalty, or rank adjustment may be able to incorporate the advertiser rank 444 in addition to the ad score.

Figure 5:
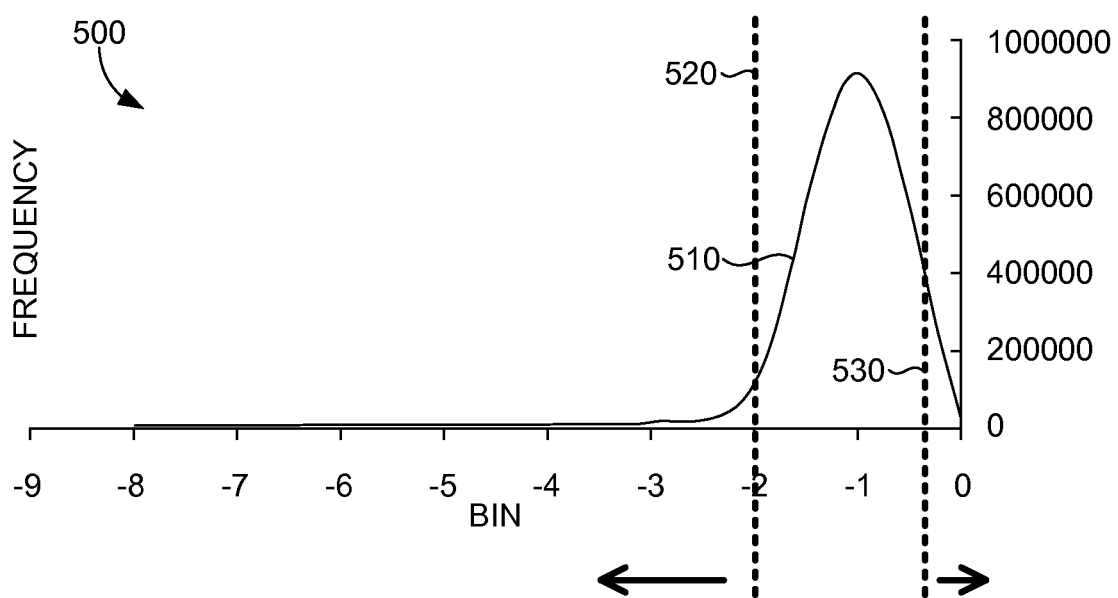
FIG. 5 is a graph illustrating how the distribution of n-grams within a language model can be used to detect pour quality advertising text, in accordance with an embodiment of the present invention.

Turning now to FIG. 5, a graph 500 illustrating how the distribution 510 of n-grams within a language model can be used to detect poor quality advertising text is shown, in accordance with embodiments of the present invention. As described previously, an output from a language model may be used as input into a machine-learning algorithm that is used to generate a quality score for the ad text. The language model, in part, allows the frequency of occurrence of a particular n-gram or series of n-grams to be determined. An n-gram may be a series of characters, words, or phrases. The graph 500 shows the frequency distribution of n-grams within the corpus of advertising text used to build the language model.

In general, advertisements having n-grams that occur more frequently than the high frequency threshold 530 may be too generic and indicate a poor quality ad. Conversely, n-grams, or a series of n-grams, that occur less frequently than low frequency threshold 520 may indicate textual errors, misspellings, or unusual usage that may indicate a poor quality. Thus, the frequency with which n-grams occurs within the language model may strongly correlate to an advertisement's overall quality score. As described previously, the output from the language model may not be the only input to the machine-learning algorithm that calculates the quality score. The frequency thresholds 520 and 530 may be determined by the machine-learning algorithm based on the training data.

Figure 6:
FIG. 6 shows a textual advertisement, in accordance with an embodiment of the present invention.

Turning now to FIG. 6, a textual advertisement 600 is shown. Textual advertisement 600 is an example of a substitution ad in which a keyword from a search query or a webpage is substituted into the ad text. In this case, "digital cameras" is the keyword and is substituted once into the title 610 and twice into the description 620. The portion of the description stating "digital cameras at for sale!" is syntactically awkward and could generate a low quality score. In an embodiment, the machine-learning algorithm has access to a static dictionary of proper nouns. The proper nouns include celebrities and geographic locations among other things. Substitution of these proper nouns, for example in advertisement 600 in the place of digital cameras would result in an even poorer quality ad. Thus, the machine-learning algorithm could associate any of these specific people or places and the word "buy" with a poor quality advertisement.

Figure 7:
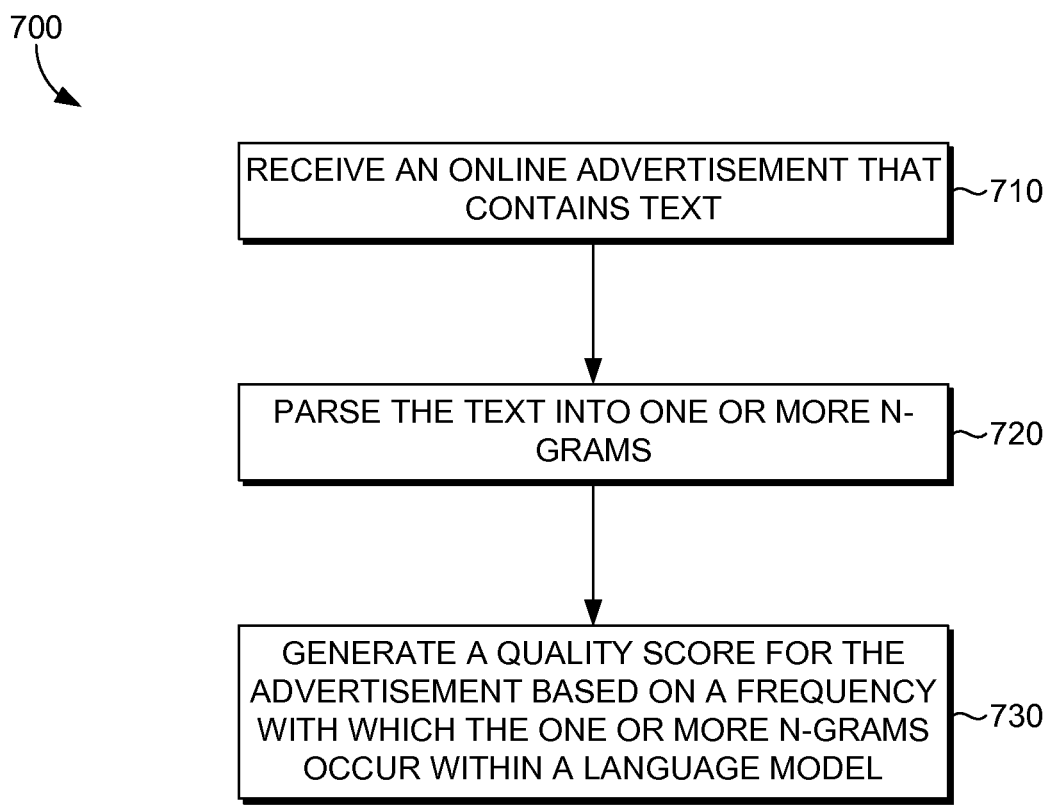
FIG. 7 is a flow chart showing a method of determining an online advertisement's quality based on the online advertisement's text, in accordance with an embodiment of the present invention.

Turning now to FIG. 7, a flow chart illustrating a method 700 of determining an online advertisement's quality based on the online advertisement's text is shown, in accordance with an embodiment of the present invention. An online advertisement may be an advertisement shown on an online webpage or other document. At step 710, an online advertisement that contains text is received. The online advertisement may be received from an advertiser that is placing the ad into an online advertising exchange to be shown on participating publishers' advertising space. In another embodiment, the online advertisement is received from an online advertisement data store that is storing ads previously received by an advertisement exchange.

At step 720, the text within the online advertisement is parsed into one or more n-grams. An n-gram may be a character, group of characters, a word, or groups of words. The n-grams may also be built to include spaces between words and punctuation. N-grams with one component may be called unigrams, n-grams with two components may be called bigrams, and n-grams with three components may be called trigrams. In one embodiment, the text is parsed into one or more trigrams, but embodiments of the present invention are not limited to using trigrams.

At step 730, a quality score is generated for the advertisement. The quality score may be based at least in part on a frequency with which the one or more n-grams occur within a language model. The output from the language model may be an input to a machine-learning algorithm that is ultimately used to generate a quality score. The output from the language model may be one of several inputs to the machine-learning algorithm. Other inputs include training data generated by viewers ranking the quality of text within an advertisement and pointing out various textual defects. Other heuristics may also be input into the machine-learning algorithm. In one embodiment, the quality score is based on the sum of a frequency with which each of the one or more n-grams occurs within a language model.

As explained previously with reference to FIG. 5, n-grams that occur infrequently may indicate a textual problem and result in a low quality score. Similarly, n-grams that occur extremely frequently may indicate a generic ad, such as "buy digital cameras." The human training data may also be referred to annotations or editorial annotations provided by users. As described previously, the quality score may be utilized in a variety of ways within the advertising exchange. For example, ads with a low quality score may be filtered. In another example, the priority or auction ranking of an advertisement with a low score is lowered so that other advertisements with a higher quality score are more likely to be displayed.

Figure 8:
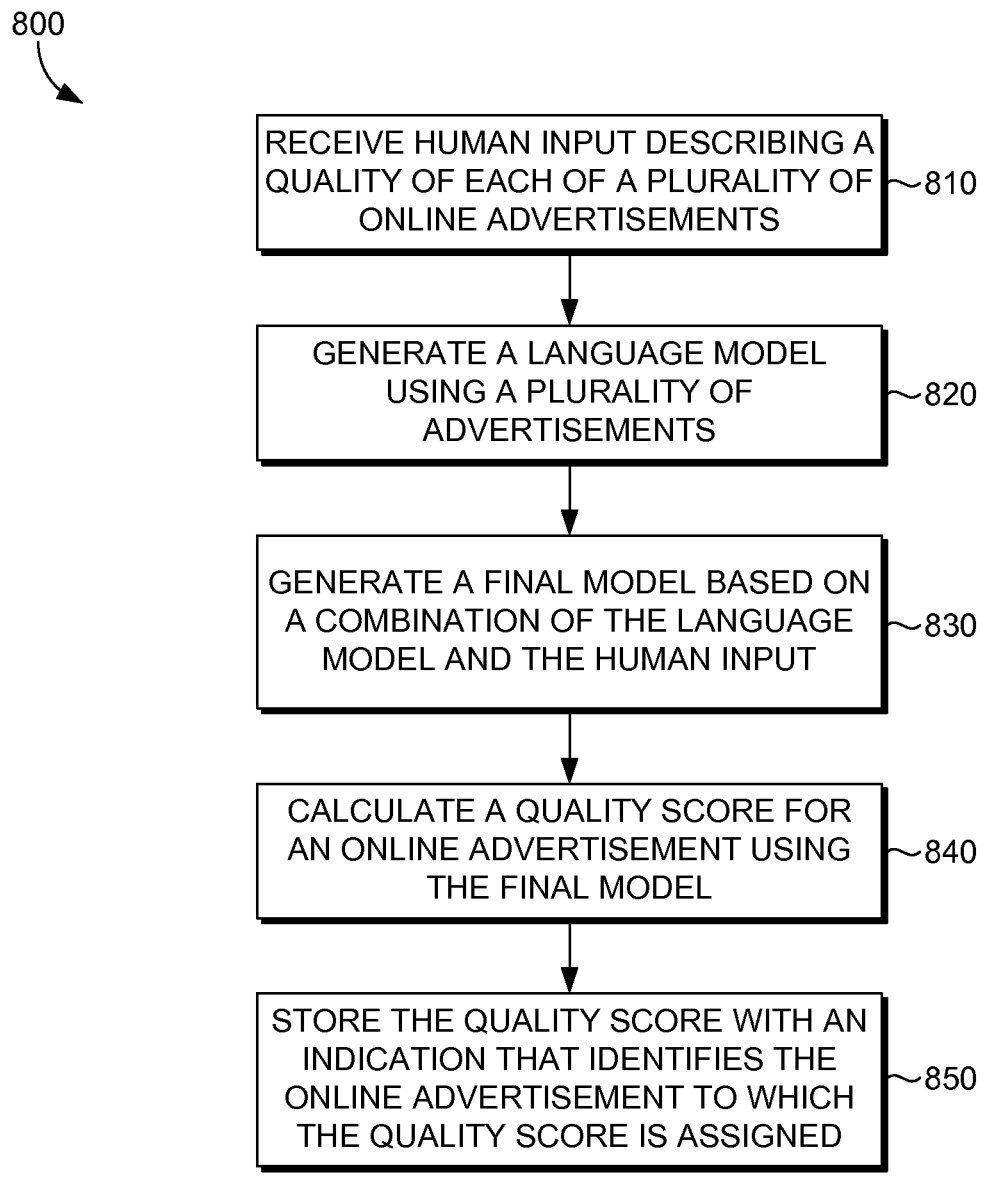
FIG. 8 is a flow chart showing a method of determining an online advertisement's quality based on the online advertisement's text, in accordance with an embodiment of the present invention.

Turning now to FIG. 8, a method 800 of determining an online advertisement's quality based on the online advertisement's displayed text, in accordance with an embodiment of the present invention. In one embodiment, method 800 occurs in the context of an online advertising exchange. At step 810, human input describing a quality of each of a plurality of online advertisements is received. The human input may be an annotation describing the overall quality of text within an individual online advertisement. In another embodiment, the human input is an annotation regarding a specific defect, such as a spelling or grammatical error within a particular portion of the text within an advertisement. In advertisements with only one or two words, the entire text may be described as bad quality. The human input may be used as training data for a machine learning algorithm.

At step 820, a language model is generated using a plurality of advertisements (i.e. a corpus of ads). In one embodiment, the language model is generated using all advertisements within an ad data store that is accessed by an online advertising exchange. The language model allows an n-gram's frequency of occurrence within the plurality of advertisements to be determined. As described previously, an n-gram could be a word or series of words. The language model would allow the frequency of a particular word or series of words' occurrence within the total plurality of advertisements to be determined. As described previously, frequently occurring words may indicate a generic ad and result in a low quality score eventually. Infrequently occurring n-grams may indicate a problem within the text.

At step 830, a final model is generated based on a combination of the language model and the human input. The final model may use a machine-learning algorithm such as a serial vector machine. At step 840, a quality score is calculated for an online advertisement using the final model. At step 860, the quality score is stored with an indication that identifies that online advertisement to which the quality score is assigned. As described previously, various actions may be taken using the quality score, including filtering advertisements and adjusting the rank of an advertisement based on the quality score. In addition, the quality score may be used to assign an advertiser rank to an advertiser who submitted the ad. In one embodiment, an advertiser's rank is the average quality score assigned to the advertisements submitted by the advertiser.

Figure 9:
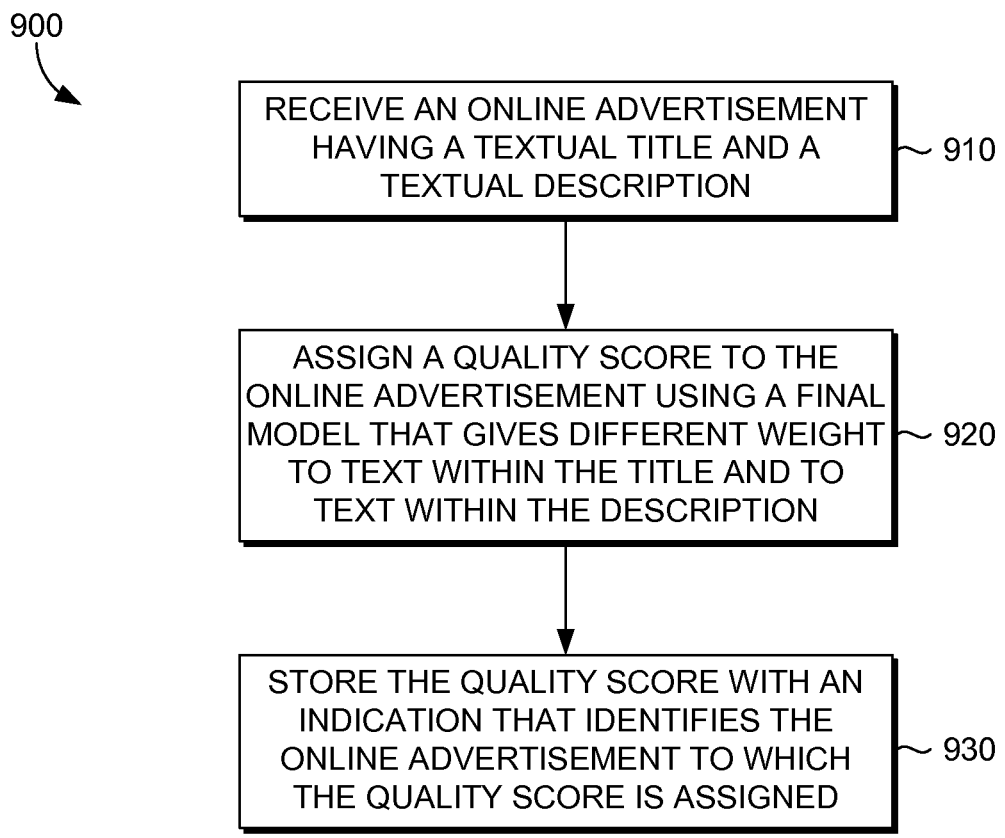
FIG. 9 is a flow chart showing a method of determining an online advertisement's quality based on the online advertisement's text, in accordance with an embodiment of the present invention.

Turning now to FIG. 9, a method 900 of determining an online advertisement's quality based on the online advertisement's text is shown, according to an embodiment of the present invention. At step 910, an online advertisement having a textual title and a textual description is received. As described previously, the online advertisement may be received shortly after the online advertisement is submitted to an online advertising exchange, or the online advertisement may be drawn from a group of previously submitted online advertisements within a data store. At step 920, a quality score is assigned to the online advertisement using a final model. The quality score is based on a calculation that gives different weights to text within the title and text within the description. For example, a title is more likely to be generic than a description. Accordingly, n-grams or words that occur frequently within a title may be less likely to be punished as generic when generating a quality score. At step 930, the quality score is stored with an indication that identifies the online advertisement to which the quality score is assigned.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A computing system comprising:
a processor; and
computer storage memory having computer-executable instructions stored thereon that, when executed by the processor, implement a method for determining whether a surcharge is to be added to a cost for displaying a particular online advertisement based on a quality of the particular online advertisement, the method comprising:
storing, in the computer storage memory, a plurality of online advertisements;
retrieving at least one of the plurality of online advertisements from the computer storage memory for presentation at an editorial webpage that is configured to receive human annotation data associated with the at least one of the plurality of online advertisements, the human annotation data including (1) a description of an overall quality of the at least one of the plurality of online advertisements and (2) an indication of a specific textual defect associated with a portion of text included in the at least one of the plurality of online advertisements;
receiving the human annotation data from the editorial webpage;
storing, in the computer storage memory, the human annotation data in association with the at least one of the plurality of online advertisements;
training, at the processor, a machine-learning algorithm with the human annotation data and with data from a language model that comprises n-grams taken from text in the plurality of online advertisements;
receiving the particular online advertisement and parsing text of the particular online advertisement to generate one or more n-grams;
at the machine-learning algorithm, receiving an input comprising an output from the language model that indicates a frequency with which the one or more n-grams from the particular online advertisement match n-grams from the language model;
based on the received input, at the machine-learning algorithm, automatically generating a quality score for the particular online advertisement;
selecting the particular online advertisement for delivery to a publisher webpage; and
determining, based on the quality score, whether the surcharge is to be added to the cost for displaying the particular online advertisement at the publisher webpage.

2. The computing system of claim 1, wherein a revenue of a publisher associated with the publisher webpage is dependent on a performance of the particular online advertisement.

3. The computing system of claim 2, wherein the revenue of the publisher is determined on a cost-per-click basis.

4. The computing system of claim 1, wherein determining whether the surcharge is to be added to the cost for displaying the particular online advertisement at the publisher webpage is further based on advertisement quality scores assigned to multiple advertisements submitted by an advertiser associated with the particular online advertisement.

5. The computing system of claim 1, wherein the method further comprises calculating an advertiser quality score that is based on advertisement quality scores assigned to advertisements submitted by an advertiser.

6. The computing system of claim 1, wherein the method further comprises determining, based on the quality score, a location on the publisher webpage at which the particular online advertisement is to be displayed.

7. The computing system of claim 1, wherein the quality score is based on a sum of a frequency with which each of the one or more n-grams occurs within the language model.

8. The computing system of claim 1, wherein the method further comprises preventing display of online advertisements that are associated with quality scores below a threshold score.

9. The computing system of claim 1, wherein the method further comprises designating the particular online advertisement to receive editorial comments at the editorial webpage when the quality score is below a threshold score.

10. The computing system of claim 9, wherein the method further comprises revising the quality score based on the editorial comments.

11. The computing system of claim 9, wherein the method further comprises providing the editorial comments as additional training data for the machine-learning algorithm.

12. A computing system for determining a cost for displaying a particular online advertisement based on a quality of the particular online advertisement, the computing system comprising a processor and computer storage memory with computer-executable instructions stored thereon that, when executed by the processor, are configured to:
store a plurality of online advertisements in an advertising data store;
generate an editorial webpage that is configured to present at least one of the plurality of online advertisements and receive human annotation data associated with the at least one of the plurality of online advertisements, the human annotation data including (1) a description of an overall quality of the at least one of the plurality of online advertisements and (2) an indication of a specific textual defect associated with a portion of text included in the at least one of the plurality of online advertisements, wherein the human annotation data is stored in association with the at least one of the plurality of online advertisements in the advertising data store;

use a machine-learning algorithm to automatically determine a quality score for the particular online advertisement, wherein the machine-learning algorithm is trained with the human annotation data and with data from a language model that comprises n-grams taken from text in the plurality of online advertisements, wherein the machine-learning algorithm receives an input comprising an output from the language model that indicates a frequency with which one or more n-grams from the particular online advertisement match n-grams from the language model, and wherein the machine-learning algorithm generates the quality score for the particular online advertisement based on the received input;

determine, based on the quality score, whether a surcharge is to be charged for displaying the particular online advertisement at a publisher webpage; and deliver the particular online advertisement to the publisher webpage.

13. The computing system of claim 12, wherein a revenue of a publisher associated with the publisher webpage is dependent on a performance of the particular online advertisement.

14. A method for determining, using a computing device having a processor and a memory, a cost for displaying a particular online advertisement based on a quality of the particular online advertisement, the method comprising:

storing, in the memory of the computing device, a plurality of online advertisements;

retrieving at least one of the plurality of online advertisements from the memory of the computing device for presentation at an editorial webpage that is configured to receive human annotation data associated with the at least one of the plurality of online advertisements, the human annotation data including (1) a description of an overall quality of the at least one of the plurality of online advertisements and (2) an indication of a specific textual defect associated with a portion of text included in the at least one of the plurality of online advertisements;

receiving the human annotation data from the editorial webpage;

storing, in the memory of the computing device, the human annotation data in association with the at least one of the plurality of online advertisements;

generating a language model using text from the plurality of online advertisements, wherein the language model allows an n-gram's frequency of occurrence within the plurality of online advertisements to be determined;

at the processor of the computing device, generating a final model based on a combination of the language model and the human annotation data;

using the final model to automatically calculate a quality score for the particular online advertisement, wherein the quality score is based, at least in part, on a frequency with which one or more n-grams occurring in the particular online advertisement match n-grams occurring in the plurality of online advertisements;

selecting the particular online advertisement for delivery to a publisher webpage; and determining, based on the quality score, whether a surcharge is to be charged for displaying the particular online advertisement at the publisher webpage.

15. The method of claim 14, wherein a revenue of a publisher associated with the publisher webpage is dependent on a performance of the particular online advertisement.

16. The method of claim 15, further comprising storing, in the memory of the computing device, the quality score in association with an identifier for the particular online advertisement for which the quality score is calculated.

17. The method of claim 15, wherein the editorial webpage is configured to receive a selection of the portion of text associated with the specific textual defect.

18. The method of claim 15, wherein the specific textual defect includes one or more of a misspelling, gibberish, a grammatical error, a semantic error, or a punctuation error.

19. The method of claim 15, further comprising designating advertisements having quality scores within a designated range for editorial comments.

20. The method of claim 15, wherein the quality score indicates a lower quality text when the one or more n-grams derived from text within the particular online advertisement occur within the plurality of online advertisements at a high frequency that satisfies a high-frequency threshold, wherein the high frequency of occurrence is indicative of a generic advertisement.

* * * * *